United States Patent
Gupta et al.

(10) Patent No.: US 12,358,788 B2
(45) Date of Patent: Jul. 15, 2025

(54) METHANE PYROLYSIS USING STACKED FLUIDIZED BEDS

(71) Applicant: ExxonMobil Technology and Engineering Company, Annandale, NJ (US)

(72) Inventors: Ramesh Gupta, Berkeley Heights, NJ (US); Hugo S. Caram, Allentown, PA (US); Anjaneya S. Kovvali, Herndon, VA (US); Sumathy Raman, Annandale, NJ (US); David C. Dankworth, Princeton, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 951 days.

(21) Appl. No.: 17/236,418

(22) Filed: Apr. 21, 2021

(65) Prior Publication Data
US 2021/0331918 A1    Oct. 28, 2021

Related U.S. Application Data

(60) Provisional application No. 63/014,568, filed on Apr. 23, 2020.

(51) Int. Cl.
*C01B 3/30* (2006.01)
*B01J 8/00* (2006.01)
(Continued)

(52) U.S. Cl.
CPC ............ *C01B 3/30* (2013.01); *B01J 8/003* (2013.01); *B01J 8/0055* (2013.01); *B01J 8/1827* (2013.01);
(Continued)

(58) Field of Classification Search
CPC .................................. C01B 3/30; B01J 8/003
See application file for complete search history.

(56) References Cited

U.S. PATENT DOCUMENTS 3,284,161 A    11/1966    Pohlenz et al.
3,625,932 A  * 12/1971    Green .................... C08F 14/06
                                                    526/918
(Continued)

OTHER PUBLICATIONS

Babu, M. P. et al., (2017) "Continuous segregation of binary heterogeneous solids in fluidized beds", Particuology, vol. 35, 8 Pages.
(Continued)

*Primary Examiner* — Paul A Wartalowicz
(74) *Attorney, Agent, or Firm* — Shook, Hardy & Bacon L.L.P.

(57) ABSTRACT

Systems and methods are provided for conversion of methane and/or other hydrocarbons to hydrogen by pyrolysis while reducing or minimizing production of carbon oxides. The conversion of hydrocarbons to hydrogen is performed in one or more pyrolysis or conversion reactors that contain a plurality of sequential fluidized beds. The fluidized beds are arranged so that the coke particles forming the fluidized bed move in a counter-current direction relative to the gas phase flow of feed (e.g., methane) and/or product ($H_2$) in the fluidized beds. By using a plurality of sequential fluidized beds, the heat transfer and management benefits of fluidized beds can be realized while also at least partially achieving the improved reaction rates that are associated with a plug flow or moving bed reactor.

18 Claims, 3 Drawing Sheets

(51) Int. Cl.
*B01J 8/18* (2006.01)
*B01J 8/24* (2006.01)

(52) U.S. Cl.
CPC .............. *B01J 8/1881* (2013.01); *B01J 8/24* (2013.01); *B01J 2208/00176* (2013.01); *B01J 2208/00327* (2013.01); *B01J 2208/00991* (2013.01); *C01B 2203/0272* (2013.01); *C01B 2203/0805* (2013.01); *C01B 2203/0872* (2013.01); *C01B 2203/1241* (2013.01)

(56) References Cited

U.S. PATENT DOCUMENTS 9,359,200 B2 6/2016 Maass et al.
2011/0107512 A1* 5/2011 Gilbert ................ F24D 17/0005
4/596

OTHER PUBLICATIONS

Bode, A. et al., (2016) "Methane Pyrolysis and CO2 Activation—Technologies with Application Options for Hydrogen, Carbon and Synthesis Gas Production", ProcessNet Jahrestagung, p. 1342.

Chladek, J. et al., (2018) "Fluidized bed classification of particles of different size and density", Chemical Engineering Science, vol. 177, pp. 151-162.

Cocco, R. et al., (2014) "Introduction to fluidization", CEP Magazine, American Institute of Chemical Engineers, pp. 21-29.

Kenisarin, M. M., (2010) "High-temperature phase change materials for thermal energy storage", Renewable and sustainable energy reviews, vol. 14, No. 3, pp. 955-970.

Kunii, D et al., (1991) "Fluidization engineering", 2nd Edition, Butterworth-Heinemann, pp. 397-408.

Kwant, G. et al., (1995) "Particle mixing and separation in a binary solids floating fluidized bed", Powder technology, vol. 82, No. 3, pp. 279-291.

Oshitani, J. et al., (2012) "Influence of air bubbles size on float-sink of spheres in a gas-solid fluidized bed", Advanced Powder Technology, vol. 23, No. 1, pp. 120-123.

Zhao, Y. et al., (2010) "Experimental and numerical simulation studies of the fluidization characteristics of a separating gas-solid fluidized bed", Fuel Processing Technology, vol. 91, No. 12, pp. 1819-1825.

* cited by examiner

METHANE PYROLYSIS USING STACKED FLUIDIZED BEDS

PRIORITY

This application claims priority to and the benefit of U.S. Provisional Application No. 63/014,568, filed Apr. 23, 2020, the disclosure of which is incorporated herein by reference in its entirety.

FIELD OF THE INVENTION

This invention relates to systems and methods for converting methane to hydrogen while reducing or minimizing production of $CO_2$.

BACKGROUND OF THE INVENTION

One of the challenges for carbon capture or sequestration technology is applying such technology to the widely varying types of processes that consume hydrocarbons and generate $CO_2$. In addition to the difficulties of applying carbon capture technology to small point sources such as automobiles, even larger $CO_2$ sources can present problems. For example, although a refinery might be viewed as a single $CO_2$ source, current refinery configurations more closely resemble a large plurality of smaller sources. This can make it difficult to achieve economies of scale for carbon capture, as attempting to divert $CO_2$ from the various sources in a refinery to a single $CO_2$ sequestration unit presents its own challenges.

As an alternative to attempting to collect $CO_2$ from multiple point sources would be to first convert hydrocarbons to hydrogen at a central location, and then distribute the hydrogen to various systems and/or processes for consumption. In a refinery setting this could be accomplished, for example, by steam reforming of hydrocarbons (such as methane). While this can potentially create a single $CO_2$ source, the underlying problem of substantial $CO_2$ generation still remains.

An alternative to using steam reforming to generate hydrogen is to use methane pyrolysis (or more generally hydrocarbon pyrolysis). During pyrolysis, methane can be converted into hydrogen and solid carbon, thus avoiding the stoichiometric $CO_2$ production associated with steam reforming.

Unfortunately, methane pyrolysis provides a variety of additional challenges. For example, in addition to being an endothermic process, methane pyrolysis requires temperatures well above the temperatures needed for steam reforming. Generating the heat required to achieve such temperatures can potentially be a source of $CO_2$. In order to mitigate the heating requirement, efficient recovery and/or transfer of heat is also desirable. Other difficulties can be related to managing heat within the reaction zone of a reactor while also maintaining a desirable reaction rate.

What is needed are systems and methods that can allow for conversion of methane (or other hydrocarbons) to hydrogen while reducing or minimizing production of $CO_2$. Preferably, the systems and methods can allow for heat management and heat recovery while also maintaining a commercially desirable reaction rate.

U.S. Pat. No. 3,284,161 describes a method for production of hydrogen by catalytic decomposition of a gaseous hydrocarbon stream. The method is performed in a two-vessel system. In a first vessel, the gaseous hydrocarbon is exposed to a catalyst at elevated temperature to form hydrogen and carbon, with the carbon being deposited on the catalyst. After separating the catalyst from the products (and any unreacted feed), the catalyst is then passed into a regenerator, where the carbon on the catalyst is combusted. The heat generated during combustion is then at least partially carried back to the first vessel by recirculation of the catalyst. Prior to contacting the catalyst particles with the gaseous feed, the catalyst particles are stripped with hydrogen generated in the reaction zone. This is described as beneficial for reducing production of carbon oxides in the reaction zone.

U.S. Pat. No. 3,284,161 describes systems and methods for catalytic decomposition of methane in a counter-current flow reactor. The reactor is described as including side-to-side plates to provide multiple contacting stages within the reactor.

U.S. Pat. No. 9,359,200 describes systems and methods for thermal decomposition of methane. The methane is exposed to a counter-current flow of carbonaceous particles in either a fluidized bed or moving bed environment at sufficient temperature to pyrolyze the methane to hydrogen and carbon. The process is described as also being useful for converting smaller coke particles that are not suitable for use as fuel in blast furnace environment into particles that can be used as a fuel.

In a journal article titled "Introduction to Fluidization" (Cocco et al., pages 21-29, November 2014 issue of CEP Magazine, published by American Institute of Chemical Engineers), a detailed example is provided for how to calculate the minimum fluidization velocity for particles in a fluidized bed.

SUMMARY OF THE INVENTION

In various aspects, a method for reforming hydrocarbons is provided. The method includes contacting a hydrocarbon-containing feed with a first portion of coke particles in a first group of fluidized beds to form a heated hydrocarbon-containing feed, the hydrocarbon-containing feed being sequentially passed into each fluidized bed of the first group of fluidized beds. The method further includes contacting the heated hydrocarbon-containing feed with a second portion of coke particles in a second group of fluidized beds comprising one or more fluidized beds operating under pyrolysis conditions to form a hydrogen-containing effluent. The one or more fluidized beds can be externally heated. The method further includes contacting the hydrogen-containing effluent with a third portion of coke particles in a third group of fluidized beds to form a cooled hydrogen-containing effluent, the hydrogen-containing effluent being sequentially passed into each fluidized bed of the third group of fluidized beds. The method can further include flowing the first portion of coke particles, the second portion of coke particles, and the third portion of coke particles in a counter-current direction to a flow direction of at least one of the hydrocarbon-containing feed and the hydrogen-containing effluent, a fraction of the third portion of coke particles being passed into the second group of fluidized beds, a fraction of the second portion of coke particles being passed into the first group of fluidized beds. Additionally, the method can include passing a recycle fraction of the first portion of coke particles into the third group of fluidized beds. Optionally, the second group of fluidized beds can correspond to a plurality of fluidized beds operating under pyrolysis conditions In various aspects, a temperature of at least one fluidized bed in the first group of fluidized beds can be lower than a temperature of a downstream adjacent fluidized bed. In various aspects, a temperature of at least one fluidized bed in the third group of fluidized beds is lower than a temperature of an adjacent upstream fluidized bed. Optionally, a temperature of each fluidized bed in the first group of fluidized beds is lower than a temperature of a downstream adjacent fluidized bed, and wherein a temperature of each fluidized bed in the third group of fluidized beds is lower than a temperature of an adjacent upstream fluidized bed. Optionally, the first group of fluidized beds, the second group of fluidized beds, and the third group of fluidized beds can comprise sequential fluidized beds.

In some aspects, passing a recycle fraction of the first portion of coke particles into the third group of fluidized beds can include passing the recycle fraction of the first portion of coke particles into a coke particle reservoir, and passing the recycle fraction of the first portion of coke particles from the coke particle reservoir to the third group of fluidized beds.

In some aspects, passing a recycle fraction of the first portion of coke particles into the third group of fluidized beds can include separating at least a portion of the pneumatic transport gas from the hydrogen-containing effluent. In such aspects, the method can further include pneumatically transporting the recycle fraction of the first portion of coke particles using a pneumatic transport gas. Additionally, in such aspects the method can include separating the recycle fraction of the first portion of coke particles from the pneumatic transport gas. Optionally, at least a portion the pneumatic transport gas can be combined with the hydrogen-containing effluent after the pneumatically transporting.

In various aspects, a system for performing hydrocarbon pyrolysis is provided. The system can include a plurality of sequential fluidized beds in one or more reactors, the plurality of sequential fluidized beds comprising a first group of fluidized beds, a second group of fluidized beds, and a third group of fluidized beds. The system can further include an external heat source for one or more fluidized beds in the second group of fluidized beds. The system can further include a particle recycle loop providing particle transport communication between at least one fluidized bed in the third group of fluidized beds and at least one fluidized bed in the first group of fluidized beds, the particle recycle loop optionally being a pneumatic transport conduit. The system can further include a feed inlet in fluid communication with the first group of fluidized beds. Additionally, the system can include a product effluent outlet in fluid communication with the third group of fluidized beds. Optionally, the plurality of sequential fluidized beds can contain coke particles.

DETAILED DESCRIPTION OF THE EMBODIMENTS

All numerical values within the detailed description and the claims herein are modified by "about" or "approximately" the indicated value, and take into account experimental error and variations that would be expected by a person having ordinary skill in the art.

Overview

In various aspects, systems and methods are provided for conversion of methane and/or other hydrocarbons to hydrogen by pyrolysis while reducing or minimizing production of carbon oxides. The conversion of hydrocarbons to hydrogen is performed in one or more pyrolysis or conversion reactors that contain a plurality of sequential fluidized beds. The fluidized beds are arranged so that the coke particles forming the fluidized bed move in a counter-current direction relative to the gas phase flow of feed (e.g., methane) and/or product ($H_2$) in the fluidized beds. By using a plurality of sequential fluidized beds, the heat transfer and management benefits of fluidized beds can be realized while also at least partially achieving the improved reaction rates that are associated with a plug flow or moving bed reactor. It is noted that inclusion of 4 fluidized beds or more, or 5 fluidized beds or more, can be sufficient to achieve a majority of the kinetic reaction benefits of a plug flow moving bed reactor. The pyrolysis/conversion reactor can include a substantially oxygen-free reaction environment under fluidized bed reaction conditions. Because the pyrolysis environment is substantially oxygen-free, this can allow pyrolysis of methane to hydrogen and carbon with reduced or minimized direct formation of carbon oxides.

To further assist with heat management, the plurality of sequential fluidized beds can include fluidized beds for heat transfer in addition to fluidized beds for performing the desired pyrolysis reaction. For example, a first group of fluidized beds can provide heat transfer between heated coke particles and relatively cold methane. A second group of fluidized beds can correspond to the pyrolysis reaction zone. One or more of the fluidized beds in the second group of fluidized beds can be externally heated to achieve a desired pyrolysis temperature in the second group of fluidized beds. Such external heating can correspond to electrical resistance heating, induction heating, use of heating tubes inside the fluidized bed, or another convenient form of heating. Still another option for external heating can be to use plasma heating, where electrical fields are used to convert a portion of the gas flow into plasma within the fluidized bed(s) that are exposed to external heating. It is preferred that plasma is created using gases in the reactor (such as methane or hydrogen), but in other aspects gases such as $N_2$ or Ar can be used. The plasma is then injected into the fluidized bed using plasma jet generators connected to the fluidized bed. AC, DC, microwave, or any other type of plasma jet can be used. The second group of fluidized beds can be heated to achieve a desired pyrolysis temperature in the pyrolysis reaction zone. This second group of fluidized beds can be referred to as the pyrolysis reaction zone. A third group of fluidized beds can provide heat transfer between heated hydrogen-containing product gas and relatively cold recycled coke particles.

The second group of fluidized beds can also provide advantages with regard to reaction rate. The conversion of methane to hydrogen and carbon is an equilibrium reaction. As a result, as the concentration of hydrogen in the local environment is increased, the net conversion rate of methane to hydrogen and carbon is decreased. In a reactor where a single fluidized bed is used for pyrolysis, the well-mixed nature of fluidized beds can result in a relatively uniform hydrogen concentration throughout the bed. This reduces the net conversion of hydrogen when pyrolysis is performed in a single fluidized bed.

By using a plurality of fluidized beds that operate under pyrolysis conditions, the concentration of hydrogen can vary in the beds. For example, as methane feed flows upward through the fluidized beds, the methane will reach a first bed that is operating under pyrolysis conditions. In this first bed, the hydrogen content will be relatively low. This can allow for rapid conversion of methane to hydrogen and carbon in the first bed. As the gas flow continues upward, the gas flow will reach the second fluidized bed operating under pyrolysis conditions. Because some hydrogen is already present in the gaseous feed to the second bed, the concentration of hydrogen in the second fluidized bed will be higher, leading to a lower reaction rate. However, based on the increased reaction rate achieved in the first fluidized bed operated under pyrolysis conditions, a net increase in conversion rate can be achieved. Without being bound by any particular theory, it is noted that combining $H_2$ and carbon (solid) to form methane requires two hydrogen molecules, making such a reaction a second order reaction in $H_2$ concentration under standard kinetic models. Because of this second order dependence, the reaction rate for formation of methane is believed to vary as the square of the $H_2$ concentration. As a result, performing the pyrolysis reaction in multiple fluidized beds does not merely result in a reaction rate corresponding to a single bed having a similar total size. Instead, the increase in reaction rate achieved in fluidized beds with low concentration can be greater than the decrease in reaction rate in fluidized beds with higher concentration. This allows the plurality of fluidized beds to provide a higher net reaction rate for methane conversion than would be achieved by a single fluidized bed of the same size.

By using a plurality of sequential fluidized beds, advantages can be achieved for methane pyrolysis relative to configurations employing either a moving bed or a single fluidized bed of a similar size to the sequential fluidized beds. With regard to a single fluidized bed of similar size, it is noted that fluidized beds represent well-mixed environments. Thus, although gases in the fluidized bed do have a net flow direction, the concentration of gases within a fluidized bed is relatively constant throughout the bed. This allows a fluidized bed to have excellent heat transport capabilities, so that a relatively uniform temperature is present throughout the fluidized bed. However, for equilibrium reactions, it also means that the entire bed operates at the average concentration of reactants and products within the bed. Thus, for equilibrium reactions where the dependence on product concentration is second order (or higher) for at least one of the products, using a single fluidized bed can cause a significant decrease in net conversion rate relative to using a plurality of sequential fluidized beds having a similar total volume.

A counter-current plug flow type configuration for methane pyrolysis is an alternative option for achieving an increased net conversion rate of methane relative to a single fluidized bed configuration. A moving bed configuration can achieve increased net conversion rate for methane pyrolysis because the concentration of hydrogen is low in the portions of the moving bed where methane is first exposed to pyrolysis conditions. However, maintaining temperature control throughout a moving bed is difficult. In particular, in a moving bed or plug flow environment, transport of heat in the lateral direction (perpendicular to the flow direction of the moving bed) is poor. This means that external heating methods based on electric heating have significant difficulties in providing heat for the pyrolysis reaction in the interior of the moving bed. This can potentially be overcome by using heating tubes that are internal to the moving bed environment, but using a sufficient number of heating tubes to provide relatively even heating throughout a moving bed can also result in significant disruption or turbulence in the flow pattern. Such turbulence modifies the properties of a moving bed so that it behaves more like a fluidized bed, thus defeating the purpose of using the moving bed. Another alternative could be to use a direct heating method, such as by transferring the moving bed particles to a second reaction environment and heating the particles directly by combustion. Transferring heat into the moving bed by heating the particles can overcome the lateral heat transport difficulties for a moving bed. However, such heating of particles by combustion typically requires combustion of hydrocarbons. This would result in substantial $CO_2$ production, thus reducing or minimizing the benefit of performing the methane pyrolysis.

In contrast to systems using a single fluidized bed or a counter-current moving bed, in various aspects a plurality of sequential fluidized beds can be used to perform hydrocarbon pyrolysis. Using a plurality of sequential fluidized beds allows the heat transport benefits of fluidized beds to be achieved, so that external heating methods can be used, while still achieving an increase in net conversion rate similar to the increase provided by a moving bed reactor.

Additionally or alternately, systems and methods are provided for management of particle flow within one or more pyrolysis or conversion reactors that contain a plurality of sequential fluidized beds. One of the difficulties in managing fluidized bed(s) can be management of particle flow after the particles are withdrawn from the fluidized beds. For example, in order to recycle particles from the bottom of a fluidized bed reactor back to the top, some type of system is needed to move the particles. For commercial scale reactors, attempting to use mechanically-driven transport mechanisms (such as using a screw conveyor) for moving potentially thousands of tons of particles of hour can present various problems. Such problems can include particle agglomeration, binding, and/or particle abrasion to create undesired particle fines. In various aspects, difficulties with particle transport can be reduced or minimized by using pneumatic transport to circulate particles from the final bed of the sequential fluidized beds back to the initial bed. The gas used for the pneumatic transport can correspond to the hydrogen-containing product gas generated by the pyrolysis reactor. A gas-solids separator can be used at the top of the pneumatic transport conduit to recover the hydrogen-containing product gas from the solid particles. In addition to reducing or minimizing mechanical difficulties, the use of the product gas for the pneumatic transport can also avoid dilution of the desired product with another type of pneumatic gas.

In some aspects, the plurality of fluidized beds can be organized as a vertical stack. In such aspects, transport of coke particles from one bed to another bed can be managed by using gravity-assisted flow in conjunction with the selected fluidized bed conditions.

Definitions

In this discussion, the terms "upstream" and "downstream" are defined with respect to the flow of gas in the reactor(s). Thus, a fluidized bed that is "upstream" from the fluidized beds operating under pyrolysis conditions corresponds to a fluidized bed where the gas flow primarily corresponds to unreacted methane (and/or other hydrocarbon). A fluidized bed that is "downstream" from the fluidized beds operating under pyrolysis conditions corresponds to a fluidized bed where the gas flow contains a substantial amount of hydrogen. Thus, the first group of fluidized beds is upstream from the fluidized beds that are operated under pyrolysis conditions (i.e., the second group of fluidized beds), while the third group of fluidized beds is downstream from the fluidized beds that are operated under pyrolysis conditions. It is noted that the coke particles travel in a counter-current direction, so coke particles are heated in the heat transfer beds that are "downstream" from the fluidized beds operated under pyrolysis conditions. Similarly, the coke particles are cooled in the heat transfer beds that are "upstream" from the fluidized beds that are operated under pyrolysis conditions.

In this discussion, the term "external heating" is used to refer to heating of fluidized beds using an external heat source, such as electrical heating, induction heating, heating using heat transfer tubes, or another method. It is noted that the term "external" refers to the source of the heat, not the location of the heating. Thus, heat transfer tubes located within a fluidized bed correspond to "external" heating of the bed. This is in contrast to heat transfer beds where substantially all of the heating/cooling is due to the temperature difference between the fluidized coke particles in the bed and the gas flow within the bed.

In this discussion, the term "adjacent" can be used to describe the relative location of a fluidized bed. For example, a fluidized bed that is the "upstream adjacent" bed to the fluidized beds operating under pyrolysis conditions corresponds to the last heat exchange fluidized bed the methane feed is exposed to prior to being exposed to pyrolysis conditions. A fluidized bed that is "downstream adjacent" to the fluidized beds that are externally heated corresponds to the first fluidized bed that the product gas flow is exposed to after leaving the fluidized beds that are externally heated.

In this discussion, "sequential" fluidized beds refer to a plurality of fluidized beds where each fluidized bed is in both fluid communication and solid particle transfer communication with any adjacent fluidized beds. It is noted that the first bed and the last bed of the sequential fluidized beds have only one adjacent bed; the remaining fluidized beds in sequential fluidized beds have both an adjacent upstream fluidized bed and an adjacent downstream fluidized bed.

In this discussion, a "hydrocarbon-containing feed" is defined as a feed comprising 50 vol % or more of $C_1$-$C_4$ alkanes, or 75 vol % or more, or 95 vol % or more, or 98 vol % or more, such as up to substantially all of the feed corresponding to $C_1$-$C_4$ alkanes. Examples of suitable feeds include methane and natural gas. In some aspects, a hydrocarbon-containing feed can include 10 vol % or less of $N_2$, or 5.0 vol % or less, or 2.0 vol % or less, such as down to including substantially no $N_2$ (less than 0.1 vol %).

Temperature Management in Sequential Plurality of Fluidized Beds

In various aspects, one of the advantages of using a sequential plurality of fluidized beds to perform pyrolysis is that the amount of heat lost as waste heat can be reduced or minimized. The reduction in the amount of lost or waste heat can be achieved by a) using heat transfer fluidized beds both upstream and downstream from the fluidized beds that are operating under pyrolysis conditions, and/or b) using heat transfer fluidized beds both upstream and downstream from the fluidized beds that are externally heated. It is noted that in various aspects, the fluidized beds operating under pyrolysis conditions may be the same or have substantial overlap with the fluidized beds that are externally heated.

In some aspects, the external heating method for the fluidized beds can be selected to reduce or minimize external production of $CO_2$. Examples of heating methods that can reduce or minimize external production of $CO_2$ include (but are not limited to) combustion of the hydrogen-containing product to provide steam (or another heated fluid) for heating tubes; electrical heating; induction heating; and plasma heating. If desired, combinations of external heating methods can also be used. By using a plurality of sequential fluidized beds, sufficient lateral heat transport is available within the reaction environment to allow external heating (such as electrical heating or induction heating) while maintaining a relatively uniform lateral temperature profile within an individual fluidized bed.

The external heating methods can be used to heat one or more, or two or more, of the plurality of fluidized beds operating under pyrolysis conditions. Optionally, one or more beds not operating under pyrolysis conditions can also be externally heated. In order to achieve pyrolysis of methane, the temperature in the plurality of fluidized beds operating under pyrolysis conditions can be 1000° C. or more, or 1100° C. or more, or 1200° C. or more, or 1300° C. or more, or 1400° C. or more, such as up to 1600° C. or possibly still higher. For example, the temperature in the fluidized bed can be 1000° C. to 1600° C., or 1100° C. to 1600° C., or 1000° C. to 1400° C., or 1100° C. to 1400° C.

The temperature of the fluidized beds for heat transfer (i.e., that are not operating under pyrolysis conditions) can vary depending on a variety of factors, including the number of fluidized beds used for heat transfer, the superficial velocity of the input/product gas flow within the fluidized beds, and the residence time of the coke particles in the fluidized beds.

Any convenient temperature profile can be used for the first group of upstream fluidized beds and or the third group of downstream fluidized beds. The first group of fluidized beds can be used to transfer heat from hot coke particles leaving the pyrolysis reaction zone to the input methane (or other hydrocarbon) gas flow. This can raise the temperature of the input gas flow from an initial temperature to a temperature in the upstream fluidized bed adjacent to the pyrolysis reaction zone that differs from the temperature in the pyrolysis reaction zone by 350° C. or less, or 300° C. or less, or 250° C. or less, such as down to 50° C. or possibly a still smaller difference. Similarly, the third group of fluidized beds can be used to transfer heat from hot product gas leaving the pyrolysis zone to cold coke particles. This can raise the temperature of the coke particles from an initial temperature to a temperature in the downstream fluidized bed adjacent to the pyrolysis reaction zone that differs from the temperature in the pyrolysis reaction zone by 200° C. or less, or 100° C. or less, or 50° C. or less, such as down to 20° C. or possibly still a smaller difference. In some aspects, the coke particles introduced into the final downstream bed can be at an initial temperature corresponding to roughly ambient temperature, such as a temperature of 10° C. to 50° C. In other aspects, the coke particles introduced into the final downstream bed can be pre-heated to a temperature of 50° C. to 300° C., or 100° C. to 300° C., or 50° C. to 200° C. Similarly, in some aspects, the input methane (or other hydrocarbon) feed introduced into the first upstream bed can be at roughly ambient temperature, such as a temperature of 10° C. to 50° C. In other aspects, the input feed introduced into the first upstream bed can be pre-heated to a temperature of 50° C. to 300° C., or 100° C. to 300° C., or 50° C. to 200° C.

In some aspects, the temperatures of the various fluidized beds can be selected in part in order to achieve a balance between the downward migration of thermal energy with the upward migration of thermal energy. In other words, for one or more of the sequential fluidized beds in the first group of upstream fluidized beds and/or the third group of downstream fluidized beds, the heat capacity of the coke particle flow can be selected to be roughly equal to the heat capacity of the feed or product gas flow. Mathematically, this can be expressed as $C_p$(coke particles)×<coke mass flow rate>=$C_p$(gas flow)×<gas mass flow rate>, where $C_p$ is the heat capacity per gram of the coke particles or the gas flow, respectively. It is noted that this relationship can optionally be satisfied by each individual bed, as well as for the first group of fluidized beds as a whole and/or the third group of fluidized beds as a whole. Without being bound by any particular theory, it is believed that balancing the heat capacities of the coke particle flow and the gas flow can reduce or minimize thermal losses. It is noted that the total heat capacity of the coke particle flow and the gas flow can change within the fluidized beds as pyrolysis converts methane into hydrogen and solid carbon. Thus, the heat capacity of the coke increases as the coke travels down through the sequential fluidized beds, while the heat capacity of the gas decreases as the hydrocarbon-containing feed is converted to hydrogen-containing product effluent.

For the first group of upstream beds, the second group of beds corresponding to the pyrolysis reaction zone, and the third group of downstream beds, the number of beds in each group can be selected to be any convenient number, so long as there is a plurality of beds in each group. In some examples, between 2 and 10 fluidized beds can be used in each group, or between 2 and 15. In some alternative aspects, the second group of fluidized beds can correspond to a single fluidized bed can be used for the pyrolysis reaction zone. While such a configuration does not achieve the reaction rate benefit of using multiple beds in the pyrolysis reaction zone, the heat transfer benefits of using sequential fluidized beds can still be achieved.

It is noted that the second group of beds, corresponding to the pyrolysis reaction zone, can potentially include multiple sets of reaction conditions. For example, a first portion of the fluidized beds in the pyrolysis reaction zone (one or more) can be heated to a first temperature, while a second portion of the fluidized beds in the pyrolysis zone can be heated to a second temperature. Optionally, a separate pyrolysis temperature can be used for each fluidized bed in the pyrolysis reaction zone. It is further noted that one or more fluidized beds that are not externally heated could be included within the pyrolysis reaction zone. In other words, a fluidized bed that is not externally heated can be located between two beds that are externally heated within the pyrolysis reaction zone.

The size of the fluidized beds can also be independently selected in any convenient manner. This can allow the fluidized beds in the first group of upstream beds and/or the third group of downstream beds to have different sizes than the fluidized beds in the pyrolysis reaction zone. Using different sized beds can change the average residence time for coke particles and/or gases within a fluidized bed. This can allow for independent control of average residence time. For example, the desired average residence time in a fluidized bed within the pyrolysis reaction zone may be different from the desired average residence time for coke particles in a heat transfer fluidized bed.

In addition to the superficial velocity of gas within the reactor, another factor in the size of the fluidized beds can be the size and quantity of openings in the bottom of the fluidized bed to allow coke particles to transfer between beds. In order to form a fluidized bed, a mesh tray or another type of sufficiently porous support structure can be used so that fluidizing gas can pass through the support structure while retaining the substantial majority of the coke particles in the fluidized bed. One or more openings or conduits can be provided in a support structure to allow a portion of the coke particles to fall from a fluidized bed at a higher elevation into the top of the adjacent bed in the upstream direction. As an example, by varying the size and/or number of openings in a support structure, the size of a fluidized bed can be varied at constant superficial gas velocity for the fluidizing gas. As another example, if superficial gas velocity varies due to conversion of methane to hydrogen, changing the size and/or number of openings in a support structure can allow a constant fluidized bed size to be maintained.

Another factor in the size of the fluidized beds can be the size of the reactor. As methane is converted to hydrogen plus solid carbon, one mole of methane produces two moles of hydrogen. This corresponds to an increase in gas volume as methane is converted to hydrogen. A still larger increase in gas volume can occur if larger hydrocarbons (such as the larger hydrocarbons present in natural gas) are used. One way to manage this increase in gas volume can be to allow the reactor size to increase in the pyrolysis reaction zone and/or in the downstream beds. This can allow, for example, a relatively constant superficial gas velocity to be maintained in the reactor, if desired.

In various aspects, the average residence time for the gas flow in a fluidized bed in the pyrolysis zone can vary depending on a variety of factors, including the number of fluidized beds in the pyrolysis zone, the desired net conversion of the feed to hydrogen, the temperature in the fluidized beds, the size of a given fluidized bed, and the pressure in the reactor. Examples of suitable residence times can range from 0.1 seconds to 500 seconds, or 0.1 seconds to 100 seconds, or 1 second to 100 seconds.

The flow rate of methane into the first upstream bed can be selected so that the fluidizing gas velocity is greater than the minimum fluidization velocity for the coke particles in any of the beds in the sequential plurality of fluidized beds. The minimum fluidization velocity for the coke particles can be readily estimated based on the density and particle size of each type of particle, and based on the density and viscosity of the fluidization gas.

Coke Particle Transport

One of the difficulties with performing pyrolysis using a fluidized or moving bed is managing transport of particles within the system. Unlike fluids, it is typically not feasible to transport particles within a system simply by controlling pressures. One or more of gravity, mechanical assistance, and use of a transport fluid is typically needed to in order to cause particles to flow in a desired manner within a reaction system.

In various aspects, the systems and methods described herein provide for transport of coke particles within the pyrolysis reaction system while reducing or minimizing mechanical transport of the particles and also while reducing or minimizing introduction of diluent gases that would reduce the quality of the pyrolysis product. The improved particle transport achieved herein is enabled in part by the use of a plurality of sequential fluidized beds.

The use of sequential fluidized beds provides several advantages with regard to transport of coke particles. First, within the reactor(s) containing the fluidized beds, the movement of coke particles can be controlled based on the support structure for the fluidized beds, the fluidized bed conditions, and gravity. The combination of the support structure and the fluidized bed conditions for each fluidized bed results in an average residence time for particles within each fluidized bed. This average residence time reflects the average time a particle stays within the bed until the particle passes through an opening in the support structure to fall (via gravitational pull) into the adjacent upstream bed.

Additionally, the use of sequential fluidized beds allow for substantial transfer of heat between hot coke particles that have passed through the pyrolysis reaction zone and cold methane (or other hydrocarbon) gas moving up through the heat transfer beds corresponding to the third group of fluidized beds. By transferring heat from the coke particles to the input gas flow, the temperature of coke particles exiting the first upstream bed can be between 150° C. and 300° C. This is sufficiently cool that the coke can be exposed, for example, to a hydrogen-containing stream with minimal likelihood of reaction. As a result, the hydrogen-containing product stream produced by the pyrolysis reaction system can be used as a transport gas.

As an example of using the hydrogen-containing product as a transport gas, after exiting from the first upstream fluidized bed, a portion of the coke particles can be withdrawn and travel through a conduit (via gravity) into pneumatic transport conduit. The gas for the pneumatic transport conduit can be the hydrogen-containing product gas generated by the pyrolysis reaction system. After pneumatically lifting the coke particles, the coke particles can be separated from the hydrogen-containing product gas, such as by using a cyclone separator. The hydrogen-containing product gas can then be combined with the fresh product gas from the reactor for use as product and/or for use as the transport fluid.

Using gravity and pneumatic transport for movement of coke particles within the reaction system can provide various advantages relative to a reaction system that uses mechanical transport. For example, a screw feeder is a common device for movement of solids within a reaction system. Unfortunately, mechanical transport devices such as screw feeders are prone to causing particle agglomeration, binding, and/or abrasion of particles/surfaces within a reaction system. These physical side effects of mechanical particle transport can cause substantial variation in particle sizes, which can increase the likelihood of equipment damage and/or unreliable operation.

In some optional aspects, a gas other than the hydrogen-containing product gas can be used as the pneumatic transport gas. For example, nitrogen could be used as the transport gas. Use of an inert transport gas increases the potential for a diluent gas to enter the reactor and therefore enter the hydrogen-containing product gas stream. However, such inert gases are effective for performing the pneumatic transport.

Configuration Example

Figure 1:
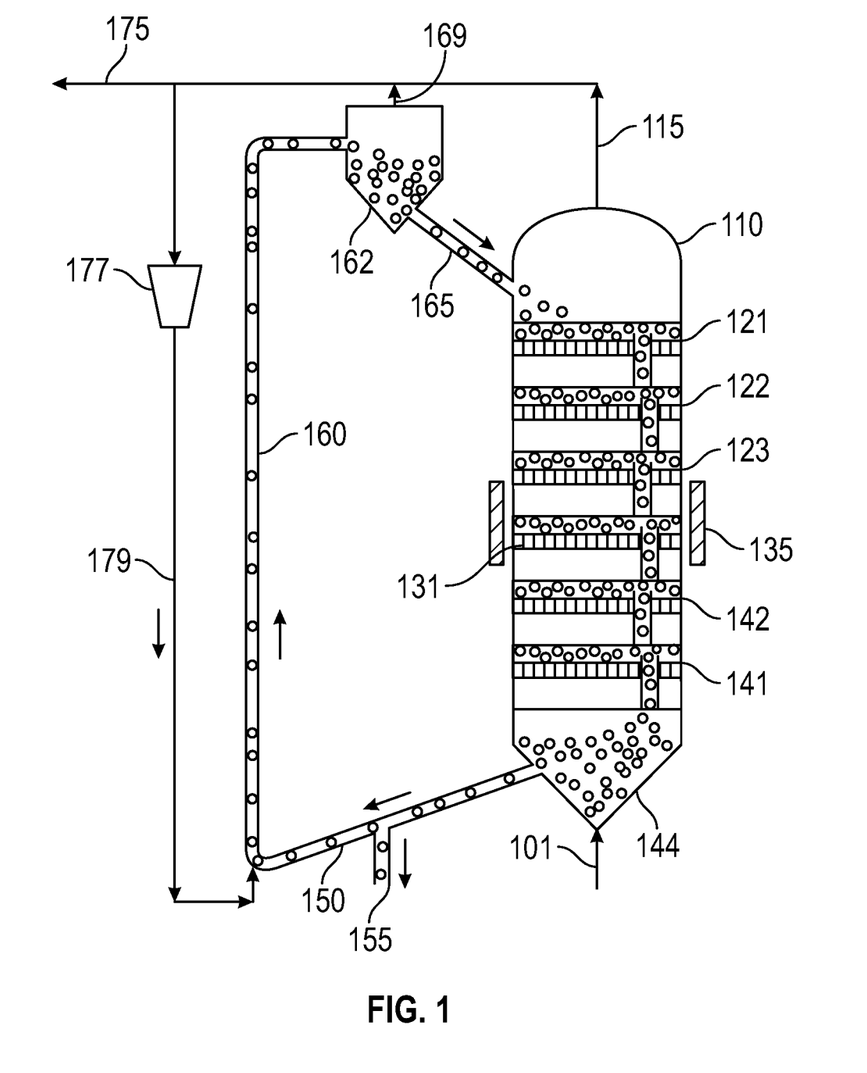
FIG. 1 shows an example of a reaction system for performing hydrocarbon pyrolysis using sequential fluidized beds.

FIG. 1 shows an example of a configuration for using sequential fluidized beds to perform methane pyrolysis. In FIG. 1, a reactor 110 is shown that contains a sequential plurality of fluidized beds. Reactor 110 is shown as a single reactor, but any convenient number of reactors could be used to house the fluidized beds. Reactor 110 includes upstream heat transfer fluidized beds 141 and 142, a fluidized bed 131 corresponding to the pyrolysis reaction zone, and downstream heat transfer fluidized beds 121, 122, and 123. Thus, fluidized beds 141 and 142 correspond to a first group of upstream fluidized beds, fluidized bed 131 corresponds to a second group of fluidized beds operating under pyrolysis conditions, and fluidized beds 121, 122, and 123 correspond to a third group of downstream fluidized beds. The number of fluidized beds shown in FIG. 1 is an example, and any convenient number of fluidized beds can be used in each group. It is noted that in some aspects, the temperature may be high enough in fluidized bed 123 and/or fluidized bed 142 for some pyrolysis to also occur, even though those beds are described as heat transfer beds.

In FIG. 1, external heater 135 can be used to heat fluidized bed 131 to a desired pyrolysis temperature. Although only a single fluidized bed is shown in FIG. 1, in other aspects a plurality of fluidized beds 131 operated under pyrolysis conditions can be used. This can allow for improved net reaction rate for the fluidized beds 131 relative to a single fluidized bed of similar size.

During operation, input gas flow 101, such as a methane or natural gas flow, can enter the reactor 110 from the bottom. The input gas flow 101 can serve as a fluidizing gas for the various fluidized beds as the gas flow moves up through the various fluidized beds. As the input gas flow 101 moves through fluidized beds 141 and 142, the input gas flow is heated by the successive fluidized beds. The input gas flow then passes into fluidized bed(s) that are externally heated 135. This results in pyrolysis of at least a portion of the input gas flow to $H_2$, so that hydrogen-containing product gas flow 115 is formed. The pyrolysis also produces solid carbon that is deposited on coke particles. The hydrogen-containing product gas flow 115 continues to pass through fluidized beds 123, 122, and 121. This cools the hydrogen-containing product gas flow prior to product gas flow 115 exiting from the top of reactor 110. It is noted that if multiple fluidized beds 131 are present, the composition of the product gas flow 115 can change as additional hydrogen is formed in each successive fluidized bed that is operated under pyrolysis conditions. Additionally, to the degree that some pyrolysis may occur in a heat transfer bed, such as fluidized bed 142 or fluidized bed 123, the composition of the input gas flow 101 could change prior to reaching fluidized bed(s) 131 and/or the composition of the hydrogen-containing product gas flow 115 could change after leaving fluidized bed(s) 131.

During operation, the coke particles in the reactor can flow in a counter-current manner relative to the input flow gas 101 and the hydrogen-containing product gas flow 115. In the example shown in FIG. 1, coke stream 165 is introduced into the top of fluidized bed 121. The coke is heated in fluidized bed 121 by hydrogen-containing product gas flow 115, and is heated further as the coke passed down into fluidized bed 122 and fluidized bed 123. The heated coke is then passed into the pyrolysis zone in fluidized bed(s) 131, which are externally heated. The pyrolysis reaction adds carbon to the coke particles. The hot coke particles then continue into fluidized bed 142 and 141, being cooled by heat exchange with input gas flow 101.

After exiting from fluidized bed 141, the cooled coke particles pass into reservoir 144. A portion of the coke particles exit from reservoir 144 to form coke particle flow 150. A portion of coke particle flow 150 can be withdrawn from the system as coke product 155. The remainder of coke particle flow 150 is then recycled back to the top of the reactor. In FIG. 1, this is accomplished using pneumatic transport conduit 160, with a portion 179 of the hydrogen-containing product gas flow 115 being used as the pneumatic transport gas. A compressor or blower 177 can be used to provide sufficient pressure for the portion 179 to act as the pneumatic transport gas. At the top of the conduit 160, the coke particles are separated from the portion 169 of hydrogen-containing product gas flow in cyclone separator 162. This forms coke stream 165. In the example shown in FIG. 1, the portion 169 of the hydrogen-containing product gas flow is combined with the hydrogen-containing product gas flow 115. The hydrogen-containing product gas flow 115 is then used to form product hydrogen 175 and pneumatic transport gas flow 179.

Although not shown in FIG. 1, additional coke processing can also be performed on the coke particles at one or more locations. For example, coke processing can include chemical or thermal activation of the coke particles. Additionally or alternately, coke processing can include management of the particle size distribution, including removal of coke particles that have grown too large and/or removal of very fine particles. Still another option can be crushing of some large particles to achieve a particle-size-distribution in a desired range.

Example of Reactor Temperature Profile

Figure 2:
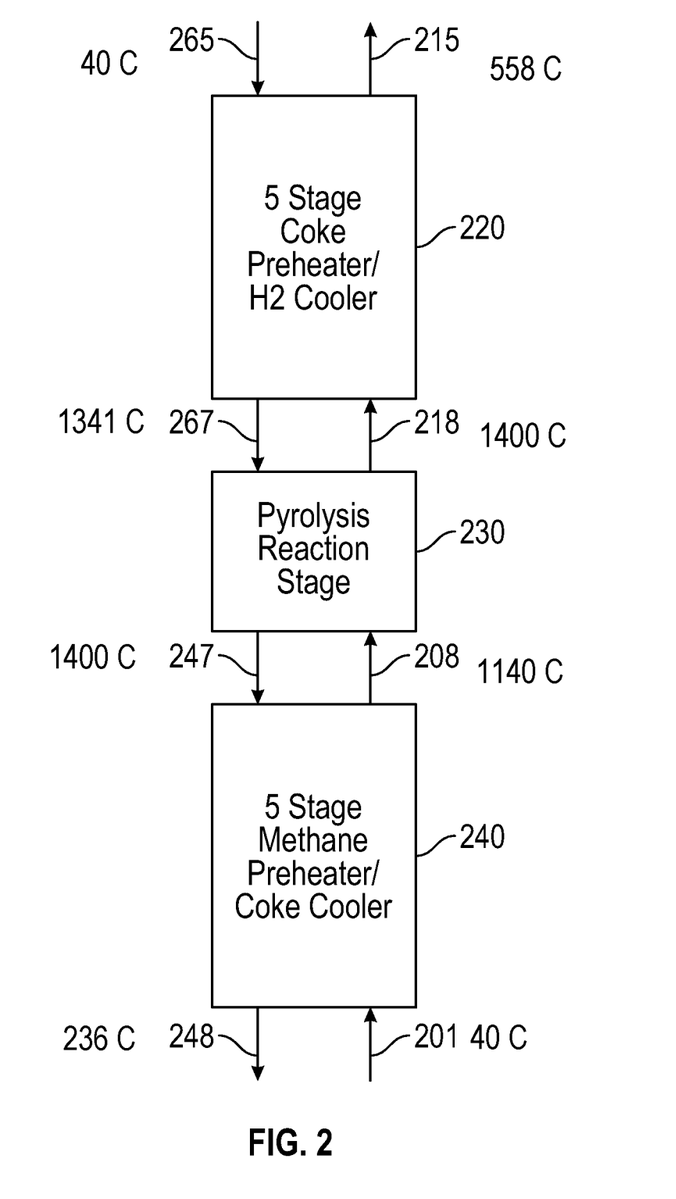
FIG. 2 shows an example of a temperature profile calculated for a pyrolysis reaction system.

FIG. 2 shows an overview of the temperature changes in the coke particle flow and the gas flow as the coke and gas pass through the sequential fluidized beds. In FIG. 2, the first group of fluidized beds 220 and the third group of fluidized beds 240 include five fluidized beds each. The second group of fluidized beds 230 can include any convenient number of fluidized beds that are operated under pyrolysis conditions. Optionally, the temperature and/or residence time of the second group of fluidized beds can vary bed-to-bed, or the beds can be operated at similar pyrolysis conditions.

In FIG. 2, cold methane feed 201 starts out at a temperature near ambient, such as a temperature of roughly 40° C. The cold methane feed 201 is heated in the third group of fluidized beds 240 by heat exchange with hot coke. This results in a hot methane feed 208 at a temperature between 1000° C. and 1300° C., such as 1140° C. The hot methane feed 208 is then passed into second group of fluidized beds 230, where pyrolysis occurs. In the example shown in FIG. 2, the second group of fluidized beds are operated at a pyrolysis temperature of roughly 1400° C. This converts a portion of the methane into hydrogen, resulting in a hot hydrogen-containing product stream 218. The hot hydrogen-containing product stream 218 is then cooled by heat exchange with coke particles as it passes through the first group of fluidized beds 220. This results in a cooled hydrogen-containing product stream 215 at a temperature, for example, between 300° C. and 600° C., such as 558° C.

In FIG. 2, the coke particles travel through the system counter-current to the gas flows. Cold coke 265 starts out at a temperature near ambient, such as 40° C. Cold coke 265 is then heated by heat exchange with the product gas flow as cold coke passes through the first group of fluidized beds 220. This can form a heated coke stream 267 at a temperature of 1000° C. to 1400° C., such as a temperature of 1340° C. as shown in FIG. 2. Optionally, the temperature of the heated coke stream 267 can differ from the temperature in the second group of fluidized beds 230 by 100° C. or less, or 50° C. or less. After pyrolysis of the methane feed in the second group of fluidized beds 230, the heated coke particles 247 can pass through the third group of fluidized beds 240. The heated coke particles 247 can be cooled by heat exchange with the input gas flow to form cooled coke particles 248. The cooled coke particles 248 can exit from the final fluidized bed at a temperature between 150° C. and 350° C., such as 236° C.

The temperature profile shown in FIG. 2 was calculated using the following procedure. For the temperature profile in FIG. 2, the calculation was performed based on having 11 total stages, but any convenient number of stages can be used.

For a stack of N stages, such as the first group 220 or third group 240 in FIG. 2 where N=5, the temperature of the solids entering at the top of the Nth stage is known. Similarly, the temperature of the gas entering the bottom of the first stage is known. Then, the temperature of solids leaving at the bottom of the first stage is given by:

$$T(\text{solid out}) = T(\text{gas in}) + \frac{T(\text{solid in}) - T(\text{gas in})}{f(E,N)} \quad (1)$$

The temperature of the gas leaving at the top of a stack of N stages is given by:

$$T(\text{gas out}) = T(\text{gas in}) + \frac{T(\text{solid in}) - T(\text{solid out})}{E} \quad (2)$$

In Equations (1) and (2), E is defined according to Equation (3):

$$E = G^* c_{pg} / S^* c_{ps} \quad (3)$$

In Equation (3), $G^* c_{pg}$ is the molar flow rate times the molar specific heat of the gas flow and $S^* c_{ps}$ is the molar flow rate times the molar specific heat of the solids. F(E/N) is defined according to Equation (4):

$$f(E, N) = \frac{1 - E^{N+1}}{1 - E} \quad (4)$$

The temperature of the nth stage is defined by Equation (5):

$$Tn = T(\text{gas in}) + [T(\text{solid out}) - T(\text{gas in})]^* f(E,n) \quad (5)$$

The calculation used to generate the values in FIG. 2 was based on the following values. The methane and coke feed were defined to enter the reactor at 40° C. The pyrolysis reaction stage was set to a temperature of 1400° C. The average molar heat capacities for hydrogen, methane, and solid carbon in J/mol*K were $Cp_{H2}$=30.9; $Cp_{CH4}$=63.46; $Cp_C$=20. It is noted that assuming that the heat capacities remain constant across the temperature range of 40° C. to 1400° C. is an idealized assumption. In practice, the heat capacities for the various substances would be expected to vary substantially over such a broad temperature range. However, it is believed that this would change only the specific values in the temperature profile. The general shape of the temperature profile would qualitatively be similar.

For the calculations used to generate the values in FIG. 2, the relative flow rates were defined based on introducing 2 moles of coke into the top of the reactor per mole of $CH_4$ feed introduced into the bottom of the reactor. Assuming near complete conversion of $CH_4$ into $H_2$ in the pyrolysis reaction zone, this leads to 2 moles of upward moving $H_2$ flow in the first group of stages 220, based on conversion of 1 mole of $CH_4$ into 2 moles of $H_2$. In the first group of stages 220, 2 moles of coke move downward. In the third group of stages 240, 1 mole of $CH_4$ moves upward, while 3 moles of coke move downward. The 3 moles of coke correspond to the initial 2 moles plus 1 mole added in the pyrolysis reaction zone.

Figure 3:
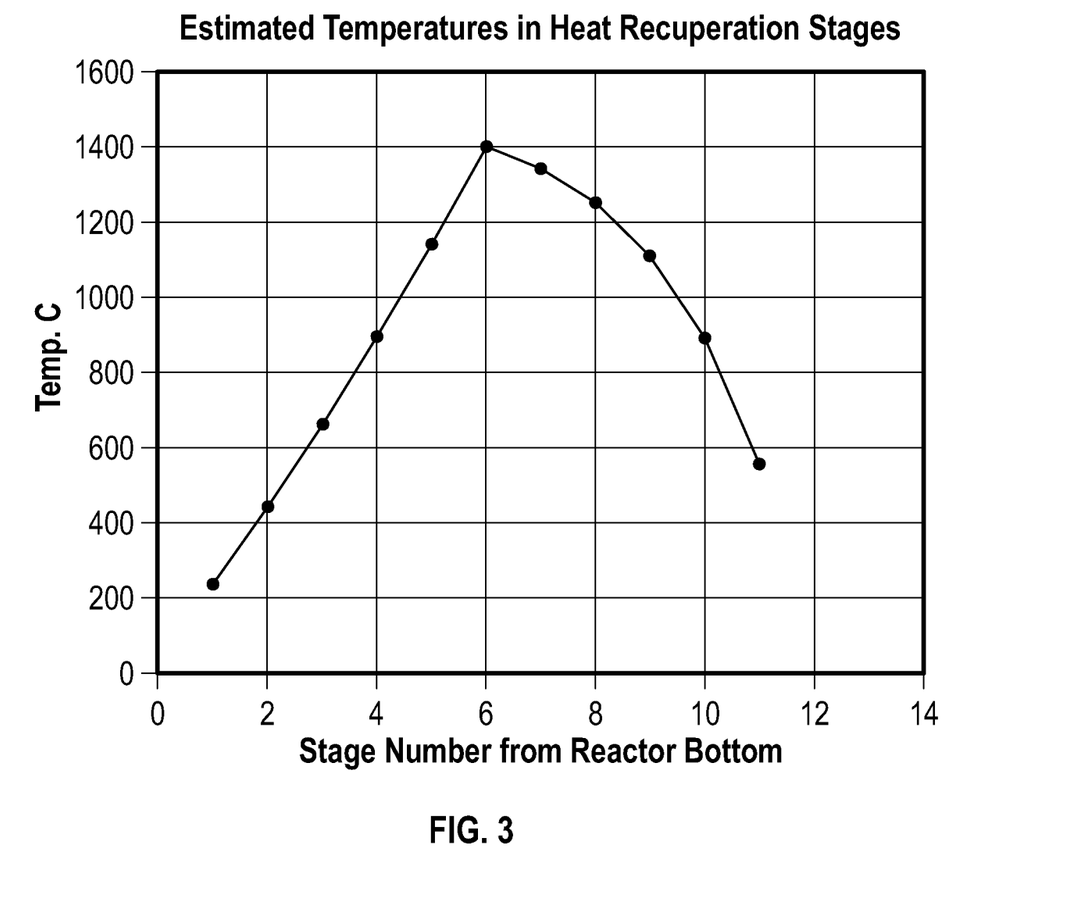
FIG. 3 shows a more detailed example of the temperature profile from FIG. 2.

The full temperature profile calculated using the above methodology and values is shown in FIG. 3. It is noted that only one fluidized bed was used in the pyrolysis stage, but the general shape of the curve would not be changed by having multiple fluidized beds at the pyrolysis temperature of 1400° C. The only difference would be having several beds at the pyrolysis temperature.

Additional Embodiments

Embodiment 1. A method for reforming hydrocarbons, comprising: contacting a hydrocarbon-containing feed with a first portion of coke particles in a first group of fluidized beds to form a heated hydrocarbon-containing feed, the hydrocarbon-containing feed being sequentially passed into each fluidized bed of the first group of fluidized beds; contacting the heated hydrocarbon-containing feed with a second portion of coke particles in a second group of fluidized beds comprising one or more fluidized beds operating under pyrolysis conditions to form a hydrogen-containing effluent, the one or more fluidized beds being externally heated; contacting the hydrogen-containing effluent with a third portion of coke particles in a third group of fluidized beds to form a cooled hydrogen-containing effluent, the hydrogen-containing effluent being sequentially passed into each fluidized bed of the third group of fluidized beds; flowing the first portion of coke particles, the second portion of coke particles, and the third portion of coke particles in a counter-current direction to a flow direction of at least one of the hydrocarbon-containing feed and the hydrogen-containing effluent, a fraction of the third portion of coke particles being passed into the second group of fluidized beds, a fraction of the second portion of coke particles being passed into the first group of fluidized beds; passing a recycle fraction of the first portion of coke particles into the third group of fluidized beds, wherein a temperature of at least one fluidized bed in the first group of fluidized beds is lower than a temperature of a downstream adjacent fluidized bed, and wherein a temperature of at least one fluidized bed in the third group of fluidized beds is lower than a temperature of an adjacent upstream fluidized bed.

Embodiment 2. The method of Embodiment 1, wherein a temperature of each fluidized bed in the first group of fluidized beds is lower than a temperature of a downstream adjacent fluidized bed, and wherein a temperature of each fluidized bed in the third group of fluidized beds is lower than a temperature of an adjacent upstream fluidized bed.

Embodiment 3. The method of any of the above embodiments, wherein the second group of fluidized beds comprises a plurality of fluidized beds operating under pyrolysis conditions.

Embodiment 4. The method of any of the above embodiments, wherein passing a recycle fraction of the first portion of coke particles into the third group of fluidized beds comprises: passing the recycle fraction of the first portion of coke particles into a coke particle reservoir; and passing the recycle fraction of the first portion of coke particles from the coke particle reservoir to the third group of fluidized beds.

Embodiment 5. The method of any of the above embodiments, wherein passing a recycle fraction of the first portion of coke particles into the third group of fluidized beds comprises: separating at least a portion of the pneumatic transport gas from the hydrogen-containing effluent; pneumatically transporting the recycle fraction of the first portion of coke particles using a pneumatic transport gas; and separating the recycle fraction of the first portion of coke particles from the pneumatic transport gas, the method optionally further comprising combining at least a portion the pneumatic transport gas with the hydrogen-containing effluent after the pneumatically transporting.

Embodiment 6. The method of any of the above embodiments, wherein the first group of fluidized beds comprises a first fluidized bed that is upstream adjacent to fluidized bed in the second group of fluidized beds, and wherein at least a portion of the hydrocarbon-containing feed is converted to hydrogen and carbon in the first fluidized bed.

Embodiment 7. The method of any of the above embodiments, wherein the third group of fluidized beds comprises a second fluidized bed that is downstream adjacent to fluidized bed in the second group of fluidized beds, wherein the hydrogen-containing effluent comprises $C_1$-$C_4$ hydrocarbon, and wherein at least a portion of the $C_1$-$C_4$ hydrocarbon is converted to hydrogen and carbon in the second fluidized bed.

Embodiment 8. The method of any of the above embodiments, a) wherein the hydrocarbon-containing feed comprises methane, natural gas, or a combination thereof; b) wherein the hydrocarbon-containing feed comprises 95 vol % or more of $C_1$-$C_4$ alkanes; or c) a combination of a) and b).

Embodiment 9. The method of any of the above embodiments, i) wherein the one or more fluidized beds of the second group of fluidized beds are externally heated using electrical resistance heating, induction heating, plasma heating, or a combination thereof; ii) wherein the one or more fluidized beds of the second group of fluidized beds are externally heated using heating tubes, a heated fluid within the heating tubes being heated by combustion of a portion of the hydrogen-containing effluent; or iii) a combination of i) and ii).

Embodiment 10. The method of any of the above embodiments, wherein the first group of fluidized beds, the second group of fluidized beds, and the third group of fluidized beds comprise sequential fluidized beds.

Embodiment 11. The method of any of the above embodiments, wherein the heat capacity of a flow of coke particles into one or more fluidized beds of the first group of fluidized beds is substantially equal to a heat capacity of a flow of hydrocarbon-containing feed into the one or more fluidized beds of the first group of fluidized beds; or wherein a heat capacity of a flow of coke particles into one or more fluidized beds of the third group of fluidized beds is substantially equal to a heat capacity of a flow of the hydrogen-containing effluent in the one or more fluidized beds of the third group of fluidized beds; or a combination thereof.

Embodiment 12. The method of any of the above embodiments, wherein the second group of fluidized beds comprises at least one fluidized bed that is not externally heated.

Embodiment 13. A system for performing hydrocarbon pyrolysis, comprising: a plurality of sequential fluidized beds in one or more reactors, the plurality of sequential fluidized beds comprising a first group of fluidized beds, a second group of fluidized beds, and a third group of fluidized beds; an external heat source for one or more fluidized beds in the second group of fluidized beds; a particle recycle loop providing particle transport communication between at least one fluidized bed in the third group of fluidized beds and at least one fluidized bed in the first group of fluidized beds, the particle recycle loop comprising a pneumatic transport conduit; a feed inlet in fluid communication with the first group of fluidized beds; and a product effluent outlet in fluid communication with the third group of fluidized beds, the plurality of sequential fluidized beds optionally comprising coke particles.

Embodiment 14. The system of claim 17, the system further comprising a pneumatic transport gas recycle loop providing fluid communication between the product effluent outlet and the particle recycle loop, wherein the particle recycle loop and the pneumatic transport gas recycle loop comprise a gas-solid separation stage.

Embodiment 15. A hydrogen-containing effluent produced according to the method of any of Embodiments 1-12 or by the system of any of Embodiments 13-14.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for reforming hydrocarbons, comprising:
contacting a hydrocarbon-containing feed with a first portion of coke particles in a first group of fluidized beds to form a heated hydrocarbon-containing feed, the hydrocarbon-containing feed being sequentially passed into each fluidized bed of the first group of fluidized beds;
contacting the heated hydrocarbon-containing feed with a second portion of coke particles in a second group of fluidized beds comprising one or more fluidized beds operating under pyrolysis conditions to form a hydrogen-containing effluent, the one or more fluidized beds operating under pyrolysis conditions being externally heated, the heated hydrocarbon-containing feed comprising 75 vol % or more of $C_1$-$C_4$ alkanes;
contacting the hydrogen-containing effluent with a third portion of coke particles in a third group of fluidized beds to form a cooled hydrogen-containing effluent, the hydrogen-containing effluent being sequentially passed into each fluidized bed of the third group of fluidized beds;
flowing the first portion of coke particles, the second portion of coke particles, and the third portion of coke particles in a counter-current direction to a flow direction of at least one of the hydrocarbon-containing feed and the hydrogen-containing effluent, a fraction of the third portion of coke particles being passed into the second group of fluidized beds, a fraction of the second portion of coke particles being passed into the first group of fluidized beds;
passing a recycle fraction of the first portion of coke particles into the third group of fluidized beds,
wherein a temperature of at least one fluidized bed in the first group of fluidized beds is lower than a temperature of a downstream adjacent fluidized bed, and
wherein a temperature of at least one fluidized bed in the third group of fluidized beds is lower than a temperature of an adjacent upstream fluidized bed.

2. The method of claim 1, wherein a temperature of each fluidized bed in the first group of fluidized beds is lower than a temperature of a downstream adjacent fluidized bed, and wherein a temperature of each fluidized bed in the third group of fluidized beds is lower than a temperature of an adjacent upstream fluidized bed.

3. The method of claim 1, wherein the second group of fluidized beds comprises a plurality of fluidized beds operating under pyrolysis conditions.

4. The method of claim 1, wherein passing a recycle fraction of the first portion of coke particles into the third group of fluidized beds comprises:
passing the recycle fraction of the first portion of coke particles into a coke particle reservoir; and
passing the recycle fraction of the first portion of coke particles from the coke particle reservoir to the third group of fluidized beds.

5. The method of claim 1, wherein passing a recycle fraction of the first portion of coke particles into the third group of fluidized beds comprises:
pneumatically transporting the recycle fraction of the first portion of coke particles using a pneumatic transport gas; and
separating the recycle fraction of the first portion of coke particles from the pneumatic transport gas.

6. The method of claim 5, further comprising separating at least a portion of the pneumatic transport gas from the hydrogen-containing effluent prior to the pneumatically transporting.

7. The method of claim 6, further comprising combining at least a portion the pneumatic transport gas with the hydrogen-containing effluent after the pneumatically transporting.

8. The method of claim 1, wherein the first group of fluidized beds comprises a first fluidized bed that is upstream adjacent to a fluidized bed in the second group of fluidized beds, and wherein at least a portion of the hydrocarbon-containing feed is converted to hydrogen and carbon in the first fluidized bed.

9. The method of claim 1, wherein the third group of fluidized beds comprises a second fluidized bed that is downstream adjacent to a fluidized bed in the second group of fluidized beds, wherein the hydrogen-containing effluent comprises $C_1$-$C_4$ hydrocarbon, and wherein at least a portion of the $C_1$-$C_4$ hydrocarbon is converted to hydrogen and carbon in the second fluidized bed.

10. The method of claim 1, wherein the hydrocarbon-containing feed comprises methane, natural gas, or a combination thereof.

11. The method of claim 1, wherein the hydrocarbon-containing feed comprises 95 vol % or more of $C_1$-$C_4$ alkanes.

12. The method of claim 1, wherein the one or more fluidized beds of the second group of fluidized beds are externally heated using electrical resistance heating, induction heating, plasma heating, or a combination thereof.

13. The method of claim 1, wherein the one or more fluidized beds of the second group of fluidized beds are externally heated using heating tubes, a heated fluid within the heating tubes being heated by combustion of a portion of the hydrogen-containing effluent.

14. The method of claim 1, wherein the first group of fluidized beds, the second group of fluidized beds, and the third group of fluidized beds comprise sequential fluidized beds.

15. The method of claim 1, wherein the heat capacity of a flow of coke particles into one or more fluidized beds of the first group of fluidized beds is substantially equal to a heat capacity of a flow of hydrocarbon-containing feed into the one or more fluidized beds of the first group of fluidized beds; or wherein a heat capacity of a flow of coke particles into one or more fluidized beds of the third group of fluidized beds is substantially equal to a heat capacity of a flow of the hydrogen-containing effluent in the one or more fluidized beds of the third group of fluidized beds; or a combination thereof.

16. The method of claim 1, wherein the second group of fluidized beds comprises at least one fluidized bed that is not externally heated.

17. The method of claim 1, wherein the heated hydrocarbon-containing feed comprises 95 vol % or more of $C_1$-$C_4$ alkanes.

18. The method of claim 1, wherein the heated hydrocarbon-containing feed comprises 10 vol % or less of $N_2$.

\* \* \* \* \*